United States Patent
Schwarz et al.

(10) Patent No.: US 11,046,290 B2
(45) Date of Patent: Jun. 29, 2021

(54) CONTROL SYSTEM FOR AUTOMATICALLY ACTIVATING OR DEACTIVATING A ROLL-AWAY PREVENTION FACILITY IN MOTOR VEHICLES

(71) Applicant: Bayerische Motoren Werke Aktiengesellschaft, Munich (DE)

(72) Inventors: Johannes Schwarz, Unterschleissheim (DE); Grigor Zapryanov, Garching (BG)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 193 days.

(21) Appl. No.: 16/421,678

(22) Filed: May 24, 2019

(65) Prior Publication Data
US 2019/0366987 A1    Dec. 5, 2019

(30) Foreign Application Priority Data

May 29, 2018    (DE) .................... 10 2018 208 525.0

(51) Int. Cl.
*B60T 7/12* (2006.01)

(52) U.S. Cl.
CPC ............. *B60T 7/12* (2013.01); *B60T 2201/10* (2013.01); *B60T 2220/00* (2013.01); *B60T 2220/04* (2013.01)

(58) Field of Classification Search
CPC .... B60T 2220/00; B60T 2220/04; B60T 7/12; B60T 7/122; B60T 7/14; B60T 2201/06; B60T 2201/10

(Continued)

(56) References Cited

U.S. PATENT DOCUMENTS

| 6,679,810 B1 * | 1/2004 | Boll ........................ B60T 7/122 |
| | | 477/195 |
| 2002/0023809 A1 | 2/2002 | Ehrmaier et al. |

(Continued)

FOREIGN PATENT DOCUMENTS

| DE | 100 37 576 A1 | 2/2002 |
| DE | 10 2006 005 335 A1 | 8/2007 |

(Continued)

OTHER PUBLICATIONS

German-language Search Report issued in counterpart German Application No. 10 2018 208 525.0 dated Apr. 1, 2019 with partial English translation (12 pages).

*Primary Examiner* — Atul Trivedi
(74) *Attorney, Agent, or Firm* — Crowell & Moring LLP

(57) ABSTRACT

A control system for a motor vehicle automatically activates or deactivates a parking lock or an automatic roll-away prevention facility. The control system has at least one electronic control unit which is designed such that limited maneuvering operation is possible within set boundary conditions in accordance with predefined embarking conditions and in accordance with predefined disembarking conditions, an identified intentional maneuvering demand of the driver after prior automatic roll-away prevention of the vehicle being defined as a predefined embarking condition. The limited maneuvering operation may be activatable both in the case of an activated motor and in the case of a deactivated motor proceeding from a secured state. Depending on the differently defined disembarking conditions that are satisfied, a transition can be made from the limited maneuvering operation either into the secured state, or driving operation can be permitted if the defined conditions for the automatically secured state are no longer present.

11 Claims, 5 Drawing Sheets

(58) Field of Classification Search
USPC .......................................................... 701/70
See application file for complete search history.

(56) References Cited

U.S. PATENT DOCUMENTS

| | | | |
|---|---|---|---|
| 2005/0143220 A1 | 6/2005 | Berger et al. | |
| 2005/0246081 A1* | 11/2005 | Bonnet | B60T 7/122 |
| | | | 701/38 |
| 2006/0129299 A1* | 6/2006 | Schmidt | B60T 7/122 |
| | | | 701/71 |
| 2006/0152079 A1* | 7/2006 | Werner | B60T 7/12 |
| | | | 303/191 |
| 2006/0212193 A1* | 9/2006 | Breed | B60C 23/0425 |
| | | | 701/33.7 |
| 2009/0198427 A1* | 8/2009 | Christopher Jackson | |
| | | | B60T 8/1708 |
| | | | 701/70 |
| 2011/0039658 A1* | 2/2011 | Sokoll | B60T 7/14 |
| | | | 477/195 |
| 2011/0166756 A1* | 7/2011 | Marcus | B60L 15/2081 |
| | | | 701/58 |
| 2011/0178666 A1* | 7/2011 | Marcus | B60W 30/18027 |
| | | | 701/22 |
| 2011/0202249 A1* | 8/2011 | Pothin | B60T 7/122 |
| | | | 701/70 |
| 2012/0187750 A1* | 7/2012 | Kish | B60T 7/122 |
| | | | 303/10 |
| 2012/0296543 A1* | 11/2012 | Rogers | B60T 13/662 |
| | | | 701/70 |
| 2016/0023660 A1* | 1/2016 | Yu | B60W 10/188 |
| | | | 477/188 |
| 2016/0244039 A1* | 8/2016 | Rizzo | B60T 8/322 |
| 2016/0304095 A1* | 10/2016 | Fischer | B60W 10/06 |
| 2016/0347292 A1* | 12/2016 | Schmitt | F16H 61/16 |
| 2018/0038481 A1* | 2/2018 | Wagner | B60S 3/00 |
| 2019/0366987 A1* | 12/2019 | Schwarz | B60T 7/12 |
| 2020/0114885 A1* | 4/2020 | Pursifull | B60W 30/18036 |

FOREIGN PATENT DOCUMENTS

| | | | | |
|---|---|---|---|---|
| DE | 10 2007 037 706 A1 | 2/2009 | | |
| DE | 10 2010 055 921 A1 | 8/2011 | | |
| DE | 103 92 606 B4 | 3/2017 | | |
| EP | 2 719 587 A1 | 4/2014 | | |
| GB | 2499880 A * | 9/2013 | | B60T 8/32 |
| WO | WO-2009129933 A1 * | 10/2009 | | B60T 7/14 |

* cited by examiner

FIGURE 4:

| Disembarking criteria AK | Situation | Vehicle reaction: Exit maneuvering & ... |
|---|---|---|
| P or N actuated | Driver parks vehicle | ... drive stage P/N |
| Start-stop button actuated | Driver parks vehicle | ... AUTO P and engine off |
| Brake is released, vehicle does not begin to creep within 1 s, driver absence > 10 s | 1. Driver has disembarked, vehicle is at a standstill and immobilizing brake is not applied, for example blocked by curb or slope | ... after timeout: AUTO P |
| | 2. Driver seeks to maneuver heavy trailer which has become stuck, creep torque is not sufficient (driver has 10 s time to actuate the accelerator pedal) | |
| Brake is released, vehicle does not begin to creep within 1 s, but with a delay and without accelerator pedal actuation | 1. Vehicle is at a standstill with engaged drive stage on a slope, driver and possibly further occupants have disembarked, vehicle becomes lighter and begins to creep | ... AUTO P when rolling freely |
| | 2. Vehicle is pushed, for example in order to become unstuck from a snowdrift | |

FIGURE 5:

| Disembarking criteria AK | Situation | Vehicle reaction: Exit maneuvering & ... |
|---|---|---|
| Door is closed and v > 0 km/h, driver "absent" | Driver closes door from the inside whilst vehicle is creeping | ... state driver "present", no AUTO P |
| Door is closed and v = 0 km/h, driver "present" | Driver closes door, vehicle immobilizing brake is applied | ... state driver "present", no AUTO P |
| Door is closed and v = 0 km/h, driver "absent" | Driver closes door from the inside or the outside, vehicle is at a standstill and immobilizing brake is not applied, for example blocked by curb, slope, EMF | ... AUTO P |
| Driver fastens safety belt, commences driving (accelerator pedal actuation) | Driver has ended maneuvering operation and commences driving | ... state driver "present" |
| Driver fastens safety belt, drive stage D/R, v = 0 km/h, no pedal | Vehicle in D/R but does not begin to creep, for example owing to curb, slope, EMF; driver fastens safety belt | ... state "belt dummy/driver unknown" |
| Overshooting of speed threshold > 10 km/h | Transition to driving with door ajar, no maneuvering operation | ... AUTO P at next standstill |
| Maneuvering timeout | Driver maneuvers for several minutes or depresses the brake for a long period of time at a standstill | ... AUTO P at next standstill |

CONTROL SYSTEM FOR AUTOMATICALLY ACTIVATING OR DEACTIVATING A ROLL-AWAY PREVENTION FACILITY IN MOTOR VEHICLES

CROSS REFERENCE TO RELATED APPLICATION

This application claims priority under 35 U.S.C. § 119 from German Patent Application No. 10 2018 208 525.0, filed May 29, 2018, the entire disclosure of which is herein expressly incorporated by reference.

BACKGROUND AND SUMMARY OF THE INVENTION

The invention relates to an electronic control system for automatically activating or deactivating a parking lock or a roll-away prevention facility in motor vehicles.

For example, DE 100 37 576 A1 has already disclosed an electronic control system and a method for automatically activating a parking lock in motor vehicles. The automatic activation of a parking lock when a key is removed, wherein an electronic authorization verification device is to be considered functionally equivalent to a conventional key system, is a fundamental legal requirement in certain countries. For safety reasons, it has therefore already long been the case that, even in the case of vehicles without a mechanical key, the parking lock is automatically activated, independently of a key position, in a manner dependent on at least one other operating parameter or operating state. Here, in particular, operating parameters or signals indicating a departure from the vehicle are evaluated, such as for example a non-actuated brake and/or accelerator pedal, an open driver's door (which can be interrogated for example by means of a switch in the door) and/or an unoccupied driver's seat (which can be identified for example by means of seat occupancy sensors or by means of an unfastened belt fastener). Said document relates in particular to vehicles with an electronic access and driving authorization system, in which there no longer a mechanical key present and in which, therefore, it is also no longer possible for a key to be removed. Such access and driving authorization systems are for example transponders or code cards which are carried by the driver and which communicate wirelessly (for example by radio) with an authorization checking unit installed in the vehicle. Here, it is basically the intention for the parking lock, preferably in the form of the engagement of the park position if an automatic transmission is present or else in the form of the engagement of a parking brake, to be automatically activated when the internal combustion engine is shut down. In the cited document, it is basically also possible for an automatic activation of the parking lock to be prevented as desired by means of a manually actuated OFF button.

The invention is based on the object of configuring a control system for automatically activating or deactivating a parking lock in motor vehicles in a more customer-oriented manner.

This and other objects are achieved according to the invention by a control system for automatically activating or deactivating a roll-away prevention facility in motor vehicles having at least one electronic control unit which is configured such that limited maneuvering operation is possible within set boundary conditions in accordance with predefined embarking conditions and in accordance with predefined disembarking conditions. An intentional maneuvering demand of the driver after prior automatic securing of the vehicle is defined as a predefined embarking condition.

The expression "parking lock" or "automatic roll-away prevention facility" is to be understood here in the broadest sense as a so-called "AUTO-P" function; that is to say automatic holding or automatic securing of the vehicle against rolling away in the presence of defined conditions, which indicate in particular a departure from the vehicle (for example also in accordance with the prior art), for example by way of a parking pawl of an automatic transmission and/or by way of a parking brake function of the service brake and/or by way of an electromechanical auxiliary brake or handbrake.

The invention relates to a control system for a motor vehicle for automatically activating or deactivating a parking lock or an automatic roll-away prevention facility "AUTO-P". The control system has at least one electronic control unit which is configured such that limited maneuvering operation is possible within set boundary conditions in accordance with predefined embarking conditions and in accordance with predefined disembarking conditions, an identified intentional maneuvering demand of the driver after prior automatic roll-away prevention "AUTO-P" of the vehicle being defined as a predefined embarking condition. The limited maneuvering operation may be activatable both in the case of an activated motor and in the case of a deactivated motor proceeding from the secured state "AUTO-P". Depending on the differently defined disembarking conditions that are satisfied, a transition can be made from the limited maneuvering operation either into the secured state "AUTO-P", or driving operation can be permitted if the defined conditions for the automatically secured state "AUTO-P" are no longer present.

The invention is based on the following considerations. At present, according to the prior art, it is basically the case that the selector lever position P, or the automatic parking lock, is automatically engaged in the following situations:
 after shut-down of the engine in the state in which the radio can be operated or in the ignition-off state, if selector lever position R or D is engaged;
 in the ignition-off state, if selector lever position N is engaged;
 if, in the state with selector lever position D or R engaged, the driver's safety belt is unfastened, the driver's door is opened and the brake is not depressed (=>driver absence detection).

By means of the driver absence detection, the maneuvering operation is prevented or impeded. A launch/roll-away of the vehicle without a driver is not admissible here. The vehicle is secured against rolling away by virtue of the drive stage being disengaged. An intentional maneuvering demand of the driver is not possible in the case of the prior art.

Maneuvering without a safety belt and with the driver's door open (for example when reverse parking in parking bays with a curb) in the case of automatic vehicles with shift-by-wire is presently not possible owing to functional safety requirements (ISO26262). In the event of driver absence being detected, the vehicle must be automatically secured against rolling away. Owing to this functionality, parking and maneuvering is possible for the customer only by way of further, non-intuitive control operations (for example fastening safety belt, closing door).

FIG. 3 illustrates the prior art by way of example in the form of a flow diagram.

The conditions B1, B1', B5 and B5' relate to detected driver absence on the basis of an open driver's door, on the basis of an unfastened driver's safety belt and on the basis of a released accelerator and/or brake pedal (illustrated here by three symbols). The condition B1 furthermore includes a deactivated engine, for example as a result of an automatic engine stop ("MSA stop"), in the case of a vehicle with only an internal combustion engine. The condition BP furthermore includes the absence of an internal combustion engine, or a deactivated internal combustion engine (possibly with electric drive capability), in the case of an electric vehicle or in the case of a hybrid vehicle (BEV, PHEV). The condition B5 furthermore includes an activated engine, for example in the case of "MSA stop" being prevented, in the case of a vehicle only with an internal combustion engine. The condition B5' furthermore includes an activated internal combustion engine in the case of a hybrid vehicle (PHEV).

All conditions B1, B1', B5 and B5' lead firstly to the activation of the automatic roll-away prevention facility "AUTO-P". Here, in the presence of the conditions B1 and B1', the display "off" additionally appears in order to indicate the deactivated readiness to drive, and a demand M1 for securing the vehicle against rolling away when it is intended to park the vehicle. In the presence of a condition B2, that is to say if the driver actually departs from the vehicle, AUTO-P is maintained, and a transition is for example made to a comfort disembarking state KA.

However, according to the prior art, if a maneuvering intention B6 is present on the basis of actuation of the brake (B3), on the basis of engagement of the drive stage D or R and on the basis of subsequent release of the brake pedal (B4), maneuvering cannot occur because the automatic roll-away prevention facility "AUTO-P" finds itself in an endless loop.

According to the invention, it is duly sought to basically maintain the present vehicle behavior for normal driving operation in the range close to standstill, in order to thus continue to ensure the safety requirements. However, limited maneuvering operation conforming to the above-stated safety criteria with an adapted warning strategy (display in the combination instrument) is additionally introduced.

The maneuvering operation is applied to all drive types, that is to say in the case of internal combustion engine, hybrid and purely electric drives.

This limited maneuvering operation permits maneuvering within set boundary conditions (disembarking conditions) following an intentional maneuvering demand of the driver, in particular following a re-engagement of the drive stage ("D" or "R") after prior automatic securing of the vehicle (embarking conditions).

In this way, the customer demand is better satisfied in the case of a multiplicity of parking and maneuvering situations. Furthermore, the functional availability of the vehicle is increased.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 shows a first table with examples for deactivation conditions and subsequent possible reactions.

FIG. 5 shows a second table with further examples for deactivation conditions and subsequent possible reactions.

DETAILED DESCRIPTION OF THE DRAWINGS

Figure 1:
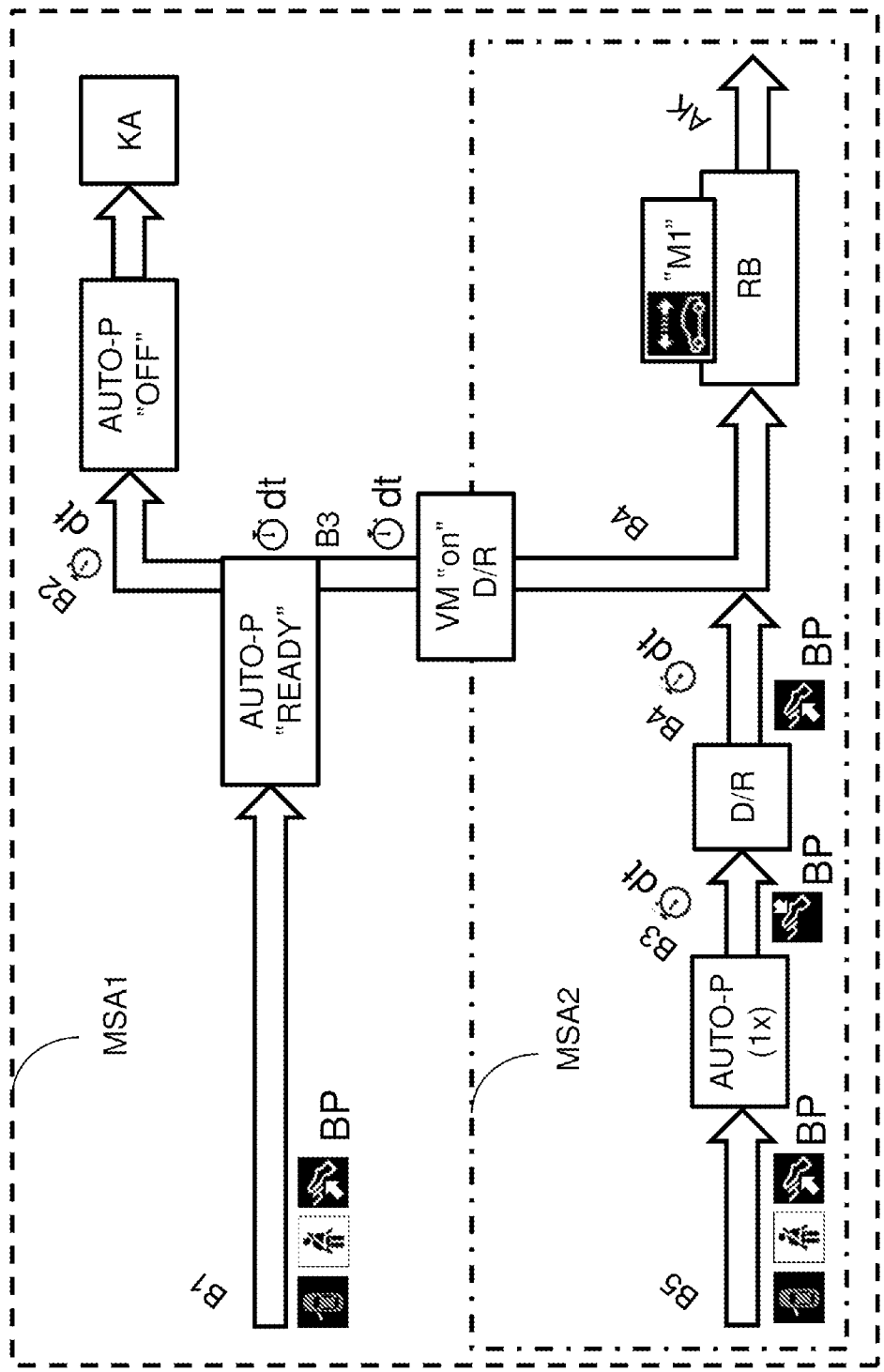
FIG. 1 shows a function overview of the automatic roll-away prevention facility "AUTO-P" with limited maneuvering operation according to the invention in the case of a vehicle with an internal combustion engine.

In FIG. 1, an electronic control unit (not illustrated in any more detail) is, in particular by way of a software program module executed by a processor, configured such that, according to the invention, limited maneuvering operation RB is made possible within set boundary conditions in accordance with predefined embarking conditions and in accordance with predefined disembarking conditions AK.

Here, an intentional maneuvering demand of the driver after prior automatic securing "AUTO-P" of the vehicle is defined as a predefined embarking condition.

An intentional maneuvering demand of the driver can be detected on the basis of a condition B3, specifically a re-engagement of the drive stage D or R in the case of a brake pedal BP initially being simultaneously actuated, and on the basis of condition B4, specifically a subsequent release of the brake pedal BP. The embarking condition is preferably predefined by the set intentional maneuvering demand of the driver by way of the conditions B3 and B4 within a predefined time window dt.

Figure 3:
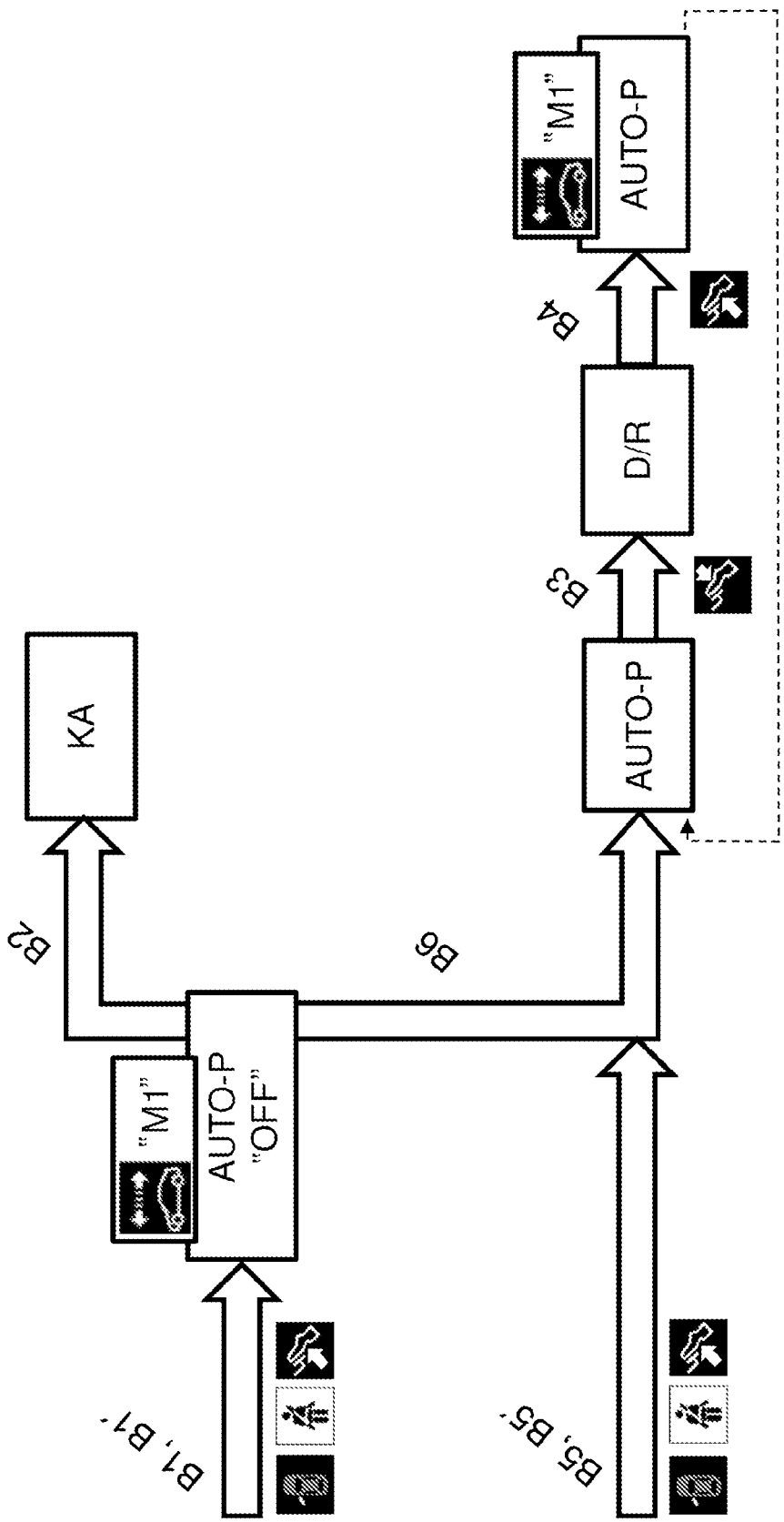
FIG. 3 shows a function overview of the automatic roll-away prevention facility "AUTO-P" according to the prior art.

A predefined embarking condition may preferably, in conjunction with the condition B1, that is to say in the case of an internal combustion engine being deactivated and driver absence being identified (see the three symbols as described in FIG. 3), be the prior automatic securing "AUTO-P", even if this has been activated and deactivated any number of times previously. In other words, the readiness to drive remains active; this is preferably also communicated to the driver by way of a corresponding display, for example "READY" instead of "OFF" (as per the prior art; FIG. 3).

By contrast, a predefined embarking condition in conjunction with the condition B5, that is to say in the case of an internal combustion engine being activated and driver absence being identified, is only a single prior automatic securing event "AUTO-P" (1x). This is preferably also communicated to the driver by way of a corresponding display.

Figure 2:
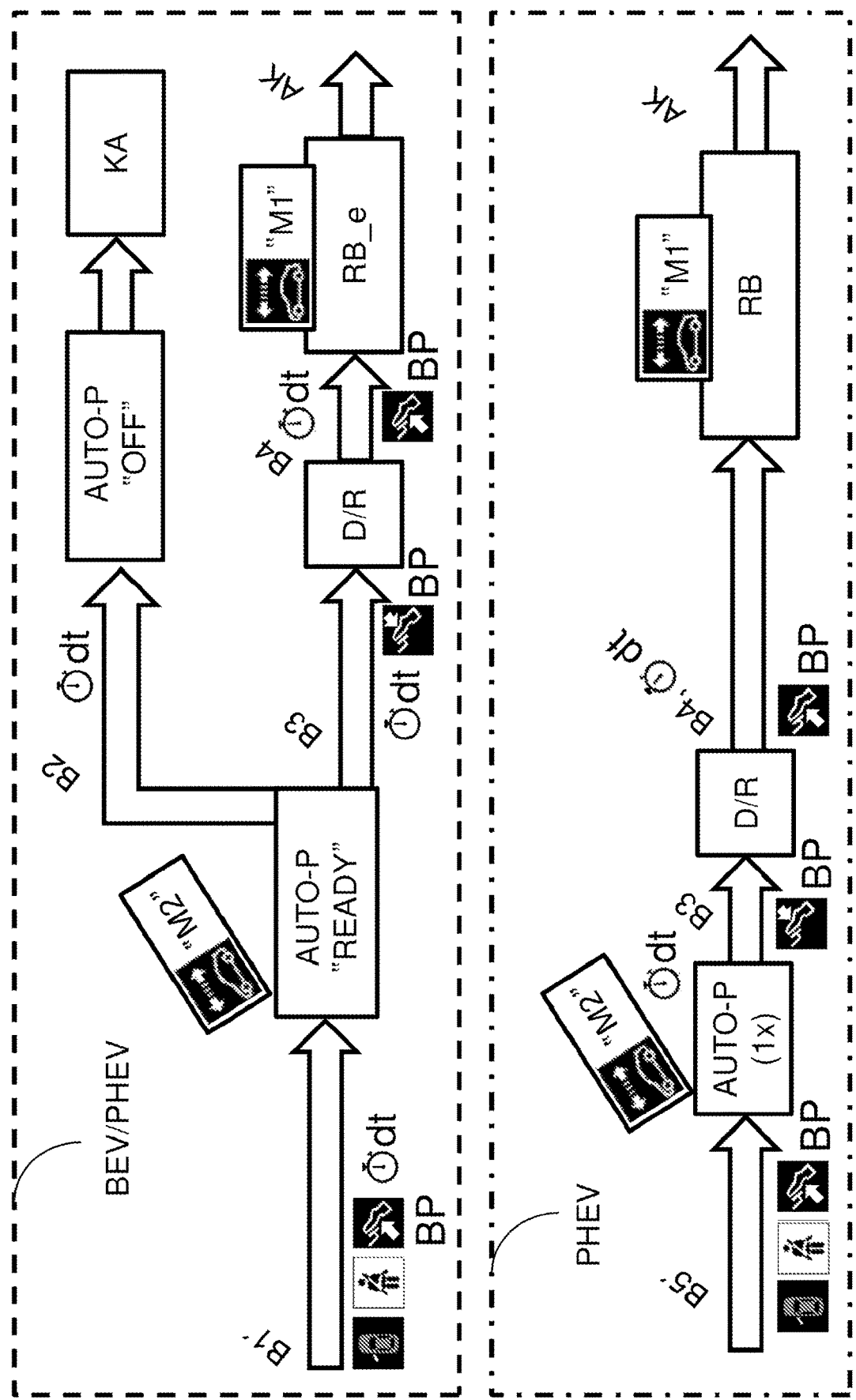
FIG. 2 shows a function overview of the automatic roll-away prevention facility "AUTO-P" with limited maneuvering operation according to the invention in the case of a vehicle with electric drive.

FIG. 2 corresponds substantially to FIG. 1, with the difference that the invention according to FIG. 2 can be applied to an electric vehicle or a hybrid vehicle with electric motor and possibly internal combustion engine. In the case of such a vehicle, the message M1 is replaced by the message M2, in which the driver is in particular, in order to resume driving, instructed to close the door or, for disembarking, to actuate the start-stop button in order to deactivate the electric motor and to engage the transmission position P. Furthermore, according to FIG. 2 (upper dashed box), by means of the electric readiness to drive, electric limited maneuvering operation RB_e can be made possible in the case of the absence of an internal combustion engine or in the case of a deactivated internal combustion engine.

FIGS. 4 and 5 show, in the form of tables and bullet points, various predefinable disembarking conditions AK from the limited maneuvering operation RB or RB_e. Here, according to the invention, the disembarking conditions AK that lead to the renewed activation of the roll-away prevention facility "AUTO-P" are particularly relevant. These are in particular:
- a further standstill of the vehicle for a predefined time (1 s) after the release of the brake pedal (BP)
- a launch of the vehicle without accelerator pedal actuation (is not imperatively a disembarking condition)
- a launch of the vehicle and an overshooting of a speed threshold (>10 km/h).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for automatically activating or deactivating a roll-away prevention facility in a motor vehicle, comprising:
    an electronic control unit operatively configured to receive inputs from vehicle sensors and to control the vehicle's roll-away prevention facility based on the sensor inputs to permit a limited maneuvering operation of the vehicle within set boundary conditions in accordance with predefined embarking conditions and in accordance with predefined disembarking conditions after a prior activation of the roll-away prevention facility,
    wherein
        the predefined embarking conditions include an intentional maneuvering demand of a driver after prior automatic securing of the motor vehicle, the intentional maneuvering demand include one or more of
            in the presence of a determination by the electronic control unit that the driver is not inside the vehicle, a driver door is closed while the vehicle is moving and,
            in the presence of a determination by the electronic control unit that the driver is inside the vehicle, the driver door is closed and a vehicle immobilizing brake is in an applied state,
            an unfastened driver seat belt is fastened and the accelerator pedal is actuated, and
            re-engagement of a drive stage of the vehicle while the brake pedal is being-simultaneously actuated, followed by release of the brake pedal within a first predetermined period.

2. The control system according to claim 1, wherein the predefined embarking conditions include a prior automatic securing event following stopping of a motor of the vehicle.

3. The control system according to claim 2, wherein the predefined embarking conditions include only a single prior automatic securing event while the motor is activated.

4. The control system according to claim 1, wherein the predefined embarking conditions include only a single prior automatic securing event while the motor is activated.

5. The control system according to claim 3, wherein the predefined embarking conditions include a standstill of the vehicle for a second predefined time after release of the brake pedal followed by renewed activation of the roll-away prevention facility.

6. The control system according to claim 5, wherein the predefined embarking conditions include a launch of the vehicle without accelerator pedal actuation, followed by a renewed activation of the roll-away prevention facility.

7. The control system according to claim 1, wherein the predefined embarking conditions include a standstill of the vehicle for a second predefined time after release of the brake pedal followed by renewed activation of the roll-away prevention facility.

8. The control system according to claim 1, wherein the predefined embarking conditions include a launch of the vehicle without accelerator pedal actuation, followed by a renewed activation of the roll-away prevention facility.

9. The control system according to claim 6, wherein the predefined embarking conditions include a launch of the vehicle and exceeding a predetermined vehicle speed threshold, followed by a renewed activation of the roll-away prevention facility at a next standstill.

10. The control system according to claim 1, wherein the predefined embarking conditions include a launch of the vehicle and exceeding a predetermined vehicle speed threshold, followed by a renewed activation of the roll-away prevention facility at a next standstill.

11. A computer product for an electronic control unit of a control system of a motor vehicle, comprising a non-transitory computer readable medium having stored thereon program code that, when executed on an electronic control unit, controls a roll-away prevention facility based on inputs from vehicle sensors to permit a limited maneuvering operation of the vehicle within set boundary conditions in accordance with predefined embarking conditions and in accordance with predefined disembarking conditions after a prior activation of the roll-away prevention facility,
    wherein the predefined embarking conditions include an intentional maneuvering demand of a driver of the motor vehicle after prior automatic securing of the vehicle, the intentional maneuvering demand include one or more of
        in the presence of a determination by the electronic control unit that the driver is not inside the vehicle, a driver door is closed while the vehicle is moving and,
        in the presence of a determination by the electronic control unit that the driver is inside the vehicle, the driver door is closed and a vehicle immobilizing brake is in an applied state,
        an unfastened driver seat belt is fastened and the accelerator pedal is actuated, and
        the driver seat belt is fastened, the vehicle is in drive or reverse and is not moving when no pedal is being actuated.

* * * * *